Dec. 29, 1970   R. J. SLEZAK   3,551,253
TIRE BAND BUILDING MACHINE
Filed April 29, 1968   3 Sheets-Sheet 1

FIG. I

INVENTOR.
RAYMOND J. SLEZAK
BY Hamilton Cook.
Renner & Kenner
ATTORNEYS

INVENTOR.
RAYMOND J. SLEZAK
BY Hamilton, Cook,
Renner & Kenner
ATTORNEYS

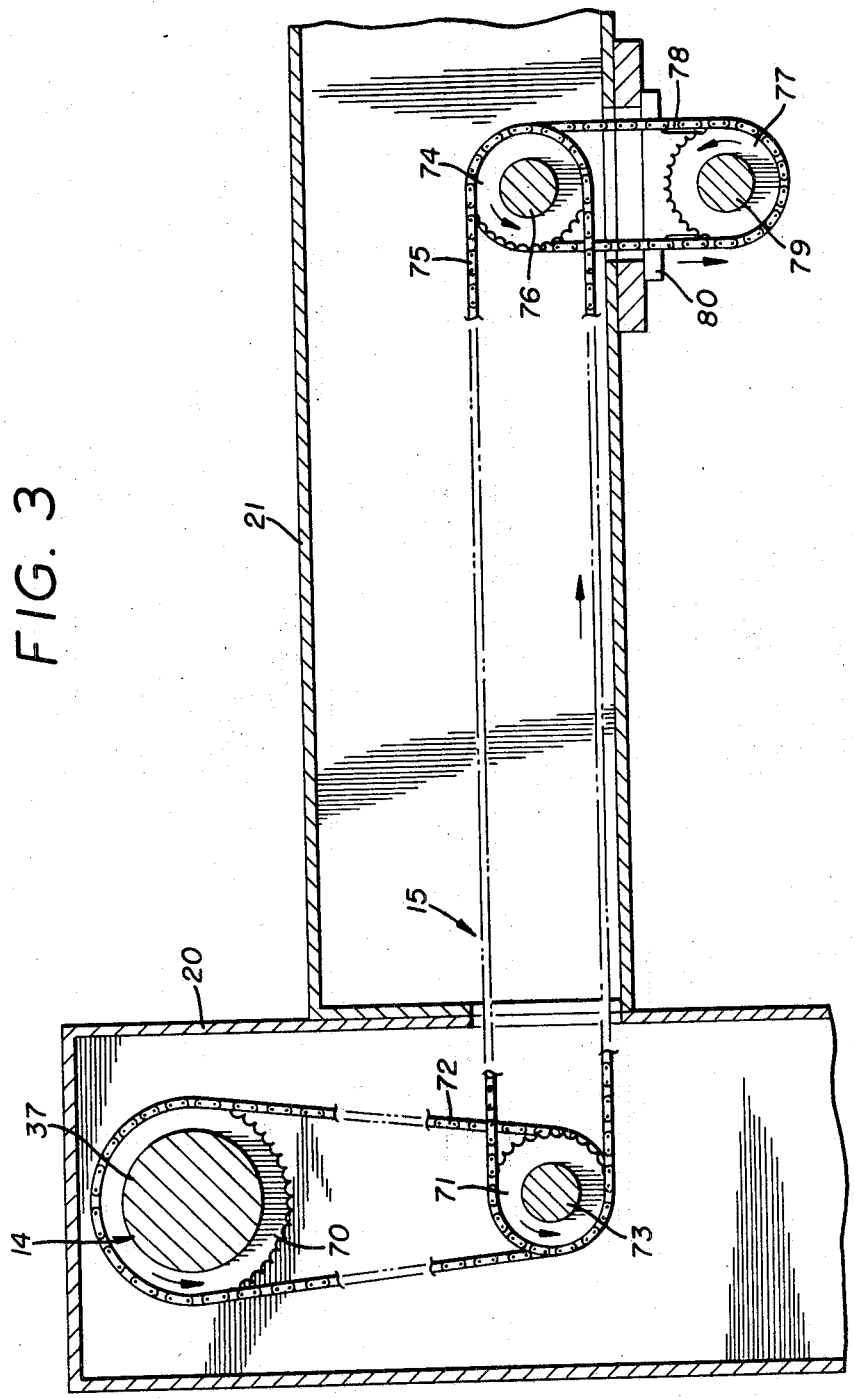

United States Patent Office 3,551,253
Patented Dec. 29, 1970

3,551,253
TIRE BAND BUILDING MACHINE

Raymond J. Slezak, Barberton, Ohio, assignor to RJS Corporation, Akron, Ohio, a corporation of Ohio
Filed Apr. 29, 1968, Ser. No. 724,863
Int. Cl. B29h *17/02, 17/28*
U.S. Cl. 156—407                           6 Claims

ABSTRACT OF THE DISCLOSURE

A belt-type building machine as used for making tire bands in a wide range of sizes. A machine has two conveyor-type flat endless belts used cooperatively to build up the laminate structure of a tire band. The two belts are known as a "building belt" and a "hugger belt." The "hugger belt" is selectively positioned in operative relation to the "building belt" and may be selectively driven at linear speeds compatible with movement of the "building belt."

BACKGROUND OF THE INVENTION

The present invention relates to apparatus for use in the building of tire bands. Tire bands are endless flexible laminate structures comprising layers or plies of rubberized cord fabric which are subsequently incorporated or assembled with beads, breaker assemblies, sidewall and tread portions to make an uncured tire carcass ready for vulcanization.

Band building machines according to the invention have two conveyor-type flat endless belts used cooperatively during building of the laminate structure of a tire band. A primary or "building belt" having a predetermined circumference receives and carries panels of the ply fabric. The ends of successively applied ply panels are joined or "spliced" together to form the endless tire band. A secondary or "hugger belt," selectively positioned below the building belt, carries the end of the first ply panel fed onto the building belt back to the operator for making the first endless splice. The hugger belt may also be selectively positioned in relation to the building belt so as to squeeze out air pockets between the panels as the plies are assembled to the desired thickness.

Band building machines according to the invention may be used in several ways, the actual building technique being determined by conditions external to the machine, such as the size bands to be made, floor space available, production quantity and the availability of other equipment.

One technique is to position several machines near a bias cutter, with the operator placing cut-to-length ply panels on the building belt, the splices being made by cooperative operation of the two belts, producing a tire band of the required circumference without additional measuring. A variation of this technique is to provide the operator with a supply of ply panels rolled up in a liner, the operator placing the panels on the building belt as the liner is unrolled.

Another technique is to position a splice conveyor between the building machine and a bias cutter so that ply panels are spliced, measured to exact length and fed onto the building belt. In this technique, the tire band is not kept tight over the building belt since the ply length is exactly measured on the splice conveyor. A variation of this technique is to use the splice conveyor merely as a table to feed a long prespliced panel into the building machine with the band being built to exact size over the building belt.

Prior art tire band building machines, such as shown in U.S. Pats. No. 2,414,021 and No. 3,038,525, have been specifically adapted for individual performance of one of the band building techniques described above. However, the art has heretofore not had the advantages of the present invention which provides for the "hugger belt" being selectively positioned in operative relation to the "building belt" and being selectively driven at linear speeds compatible with movement of the "building belt" and the condition of the ply panels thereon so that one machine can be used to perform any of the techniques described above.

A tire band building machine having a hugger belt assembly according to the invention can be used so that for any technique the leading edge or end of the first ply panel is positively carried back to the operator for making the first splice. Further, the machine can be used with the hugger belt in close proximity to the building belt and moving at such a linear speed as to squeeze the plies together without causing growth or circumferential elongation of the band. Also, the hugger belt assembly has means to vary the bight between the first opposed rolls of the two belts so that ply panels, particularly of relatively heavy or "stiff" fabric, may be fed around the building belt without wrinkling.

SUMMARY OF THE INVENTION

The object of the invention is to provide an improved belt-type building machine for use in the building of tire bands. More particularly, the object is to provide in a band building machine having two conveyor-type flat endless belts used cooperatively during building of the laminate structure of the tire band—a primary or "building belt" and a secondary or "hugger belt"—an improved hugger belt drive assembly wherein the hugger belt may be selectively positioned in operative relation to the building belt and be selectively driven at linear speeds compatible with movement of the building belt and the condition of the ply panels thereon.

DESCRIPTION OF THE DRAWINGS

FIG. 3 is an enlarged view in section of components of the hugger belt drive taken substantially as indicated on line 3—3 of FIG. 2.

DESCRIPTION OF THE PREFERRED EMBODIMENT

Figure 1:
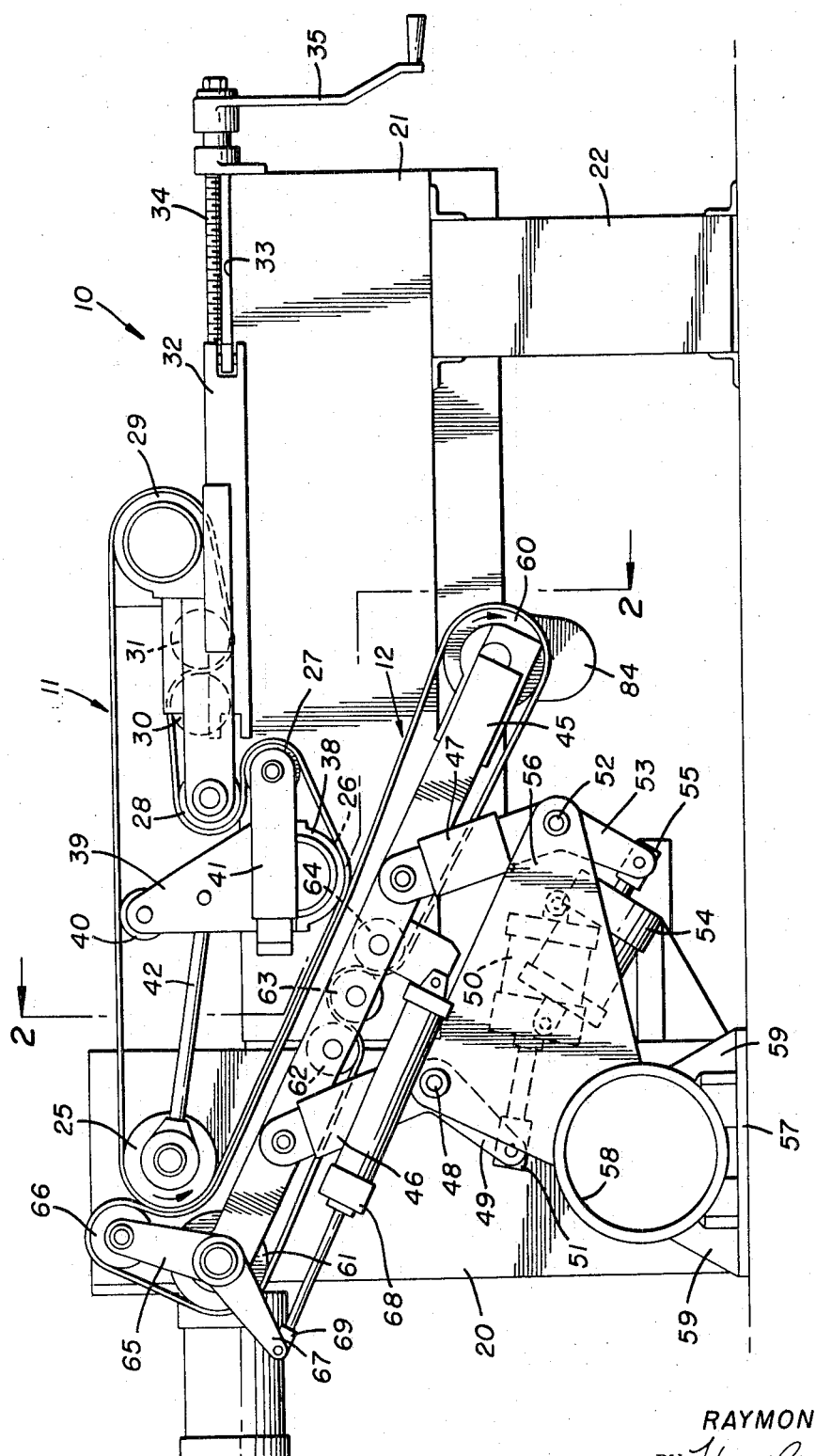
FIG. 1 is a side view, in elevation of tire band building apparatus according to the invention.

In the drawings a tire band building machine according to the invention is indicated generally by the numeral 10. The primary or building belt is indicated at 11, the secondary or hugger belt is indicated at 12, the primary belt drive means is referred to by the numeral 14 and the improved hugger belt drive assembly is referred to by the numeral 15.

The machine 10 has a floor or base mounted frame supporting the building belt 11 cantilevered to the side of the frame. The frame includes a main pedestal 20, a horizontal box member 21 and a support pedestal 22.

As shown, the building belt 11 is carried by a conventional assembly which includes a driven roll 25 extending laterally on the main pedestal 20. The building belt carriage also includes fixed rolls 26 and 27, and movable rolls 28 and 29. Rolls 30 and 31, which are also movable, are tracking rolls to maintain alignment of the belt 11 during circumferential movement around a path defined by the relative position of rolls 25, 26, 27, 28 and 29.

The movable rolls 28, 29, 30 and 31 extend laterally of a sliding carriage or mounting block 32 horizontally movable on a machined way 33 atop the frame member 21. The position of the carriage 32, and therefore the adjustment of the belt 11 for band circumference, is determined by a threaded shaft 34 and hand crank 35.

Figure 2:
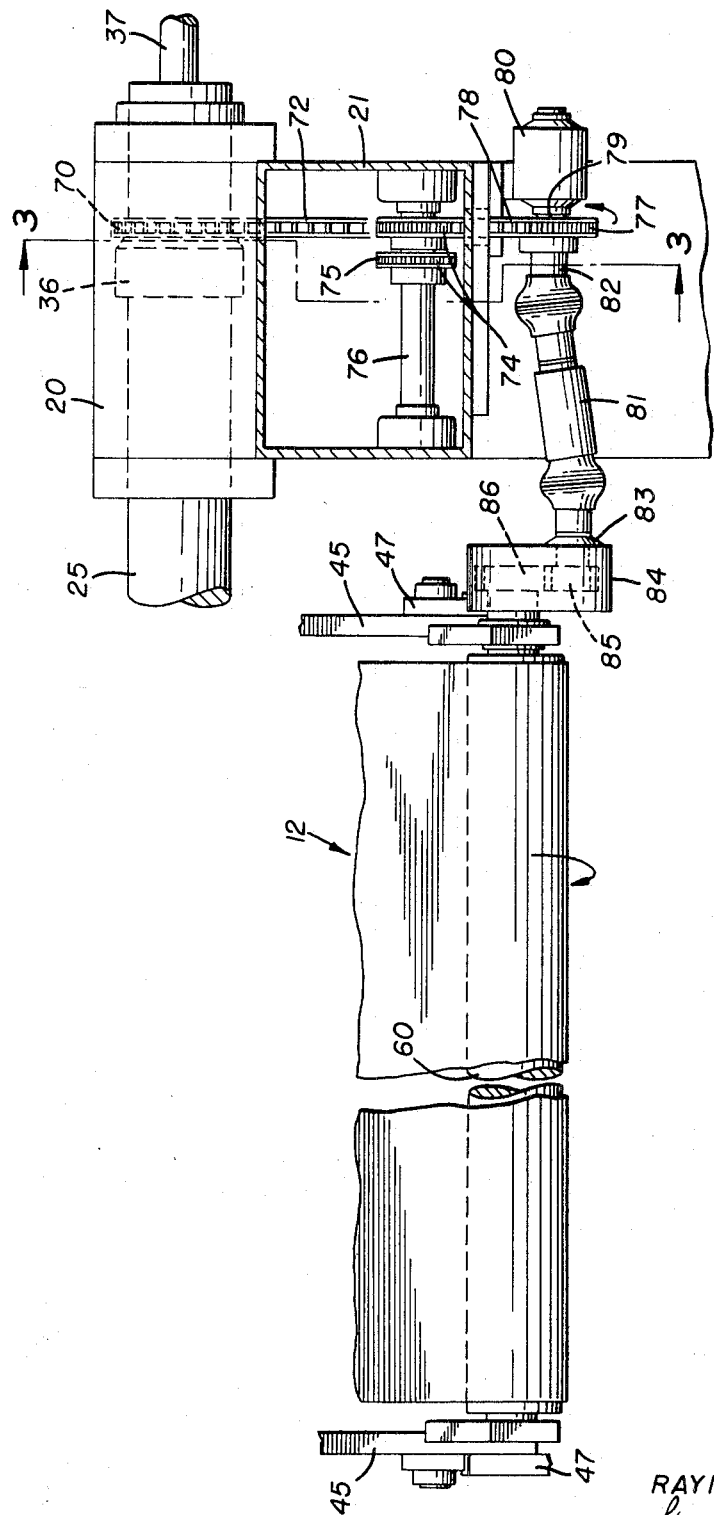
FIG. 2 is a fragmentary view of the improved hugger belt drive, taken substantially as indicated on line 2—2 of FIG. 1.

As best seen in FIG. 2, the primary belt driv means 14 is connected to the driven roll 25 through a coupling 36. The coupling 36 is carried on the end of an input drive shaft 37 which is rotatably driven by suitable motor (not shown).

Elements 25 through 37, inclusive, of the machine 10 as just described are installed and mounted in the manner shown in prior United States Pat. No. 3,038,525, to which reference may be made for such further details as required.

The mounting for the building belt 11 also includes a half collar 38 at either end of the roll 26 which extends laterally from the frame member 21. Each collar 38 carries a vertical stanchion 39 for mounting an optional belt support roller 40, the roller 27 being mounted between horizontal brackets 41. A stabilizing rod 42 journaled on the roll 25 maintains the stanchions 39 substantially in the position shown in FIG. 1.

The hugger belt 12 is carried on rolls mounted by a rectangular frame including side members 45. Each frame member 45 is pivotally connected to the upper end of crank links 46 and 47. The rear set of crank links 46 are securely mounted on a cross-shaft 48 having a depending actuator link 49 connected to the shaft of a base mounted cylinder 50 as by a clevis 51. The front set of crank links 47 are similarly mounted on a cross-shaft 52 having a depending actuator link 53 connected to the shaft of a base mounted cylinder 54 as by a clevis 55.

The cross-shafts 48 and 52 are mounted between hugger belt support plates 56. Each support plate 56 is attached to a floor mounted base plate 57, which as shown, may be fabricated of tubing 58 and structural web members 59.

The hugger belt rolls include a front or driven roll 60, a rear roll 61 and intermediate tracking rolls 62, 63 and 64 to maintain alignment of the belt 12 during circumferential movement. At either end of the shaft mounting the roll 61 are vertical stanchions 65 for mounting an optional wrap roller 66. The stanchions 65 are connected through a depending actuator link 67 to the shaft of a cylinder 68 as by a clevis 69.

The hugger belt drive assembly 15 is connected to the input drive shaft 37 of the primary belt drive means 14 by a single sprocket 70. Sprocket 70 is interconnected within the frame main pedestal 20 to a double sprocket 71 by an endless drive chain 72. The sprocket 71 is rotatably mounted on a shaft 73 and interconnected within the frame box member 21 to a double sprocket 74 by an endless drive chain 75. The sprocket 74 is rotatably mounted on a shaft 76 and interconnected below the frame box member 21 to a single sprocket 77 by an endless drive chain 78. The sprocket 77 is rotatably mounted on a shaft 79 extending laterally of a housing 80 attached to the under side of the frame box member 21.

In operation, the hugger belt 12 is selectively positioned in either cooperative relationship or in noncooperative relationship with the building belt 11 by actuation of the cylinders 50 and 54. As shown in FIG. 1, the hugger belt 12 is in a raised or cooperative relationship with the building belt 11, as to squeeze out air pockets between panels as plies (not shown) are assembled to build a band of desired thickness. When the piston shaft of cylinder 50 is retracted and the piston shaft of cylinder 54 is extended, the hugger belt 12 will be in a lowered or noncooperative relationship with the building belt 11, as to carry the end of the first ply panel fed onto the building belt back to the operator for making the first splice. Also, when a first ply panel is being carried by the building belt 11, the wrap roll 66 is preferably moved away from the roll 25 by retraction of the piston shaft of cylinder 68. After the leading end of the first ply panel enters the bight between rolls 25 and 66, the piston shaft of cylinder 68 may be extended to wrap the panel around roll 25 and facilitate carrying of the leading end by the hugger belt 12.

The hugger belt drive assembly 15 functions so that the hugger belt 12 will move at linear speeds compatible with movement of the building belt 11 and the condition of ply panels thereon, whether the belts are in a cooperative relationship or in a noncooperative relationship with each other. Referring to FIG. 2, the driven roll 60 is connected to the shaft 79 by a flexible joint drive element 81. Element 81 is of known construction and is capable of transmitting rotative forces through a range of axial orientation. The element 81 is connected as at 82 to the hub of sprocket 77. The outboard end of element 81 is connected as at 83 to one of two gears mounted within a housing 84 carried on the inboard end of the shaft mounting roll 60 between the frame members 45.

The two gears, 85 and 86, within the housing serve to reverse the direction of rotation as transmitted from the primary belt drive means 14, through elements 70–78, to the shaft 79. The lower gear 85 connected at 83 to the flexible joint drive element 81 meshes with an upper gear 86 connected to the shaft mountaing roll 60.

As shown, the hugger belt drive assembly 15 utilizes mechanically strong components which provide a positive yet comparatively inexpensive means to drive the hugger belt 12 whenever the building belt 11 is driven. Also, the components are such that the rotation of the driven roll 60 for the hugger belt 12 may be exactly correlated with rotation of the roll 25 for the building belt 11. For example, it has been found that choosing components for the drive assembly 15 so that the ratio of linear movement, hugger belt to building belt is approximately 101/100 will provide for compatible operation while lessening almost completely any tendency for a band to "grow" due to circumferential elongation during building.

I claim:

1. Apparatus for building tire bands using a primary belt and a secondary belt and having means to position said belts in cooperative relationship or in noncooperative relationship with each other and having means to drive said primary belt, characterized in that said secondary belt is driven in either relationship with said primary belt at linear speeds compatible with movement of the primary belt by a drive assembly (15) from said primary belt drive means (14).

2. Apparatus according to claim 1, characterized in that said secondary belt is a hugger belt (12) carried on rolls mounted by a rectangular frame including side members (45), each member (45) being connected to the upper end of crank links (46 and 47), each set of crank links (46 and 47) being actuated by cylinders (50 and 54) to selectively position the hugger belt (12) in cooprative relationship with the primary belt which is a building belt (11).

3. Apparatus according to claim 1, characterized in that said secondary belt is a hugger belt (12) carried on rolls mounted by a rectangular frame, said rolls including a driven roll (60), said drive assembly (15) being connected to said driven roll (60) by a flexible joint drive element (81).

4. Apparatus according to claim 3, characterized in that said apparatus has a floor mounted frame supporting the primary belt which is a building belt (11), said building belt being cantilevered to the side of the frame which includes a main pedestal (20) and a horizontal box member (21), said building belt (11) being carried by a driven roll (25) extending laterally of the main pedestal (20), the building belt drive means (14) being connected to said driven roll (25) by an input drive shaft (37), said drive assembly (15) being connected to said drive shaft (37) by a sprocket (70), said sprocket (70) being connected through a series of shafts, chains and sprockets (71–78) to a shaft (79) extending laterally of said frame box member (21), said flexible joint drive element (81) being conencted to said shaft (79).

5. Apparatus according to claim 4, characterized in that said flexible joint drive element (81) is connected to said driven roll (60) through two gears (85 and 86) carried on the end of a shaft mounting said roll (60) on said frame, said gears (85 and 86) serving to reverse the direction of rotation as transmitted from said primary belt drive means (14), through said series of shafts, chains and sprockets (71–78) to said shaft (79).

6. Apparatus according to claim 5 in which the ratio of linear movement, hugger belt (12) to building belt (11), is approximately 101/100 so as to provide for compatible operation while lessening the tendency of the band to "grow" due to circumferential elongation while building.

References Cited

FOREIGN PATENTS 1,204,401  11/1965  Germany _____ 156—394

BENJAMIN A. BORCHELT, Primary Examiner

S. C. BENTLEY, Assistant Examiner

U.S. Cl. X.R.

156—412, 421